Figure 1:
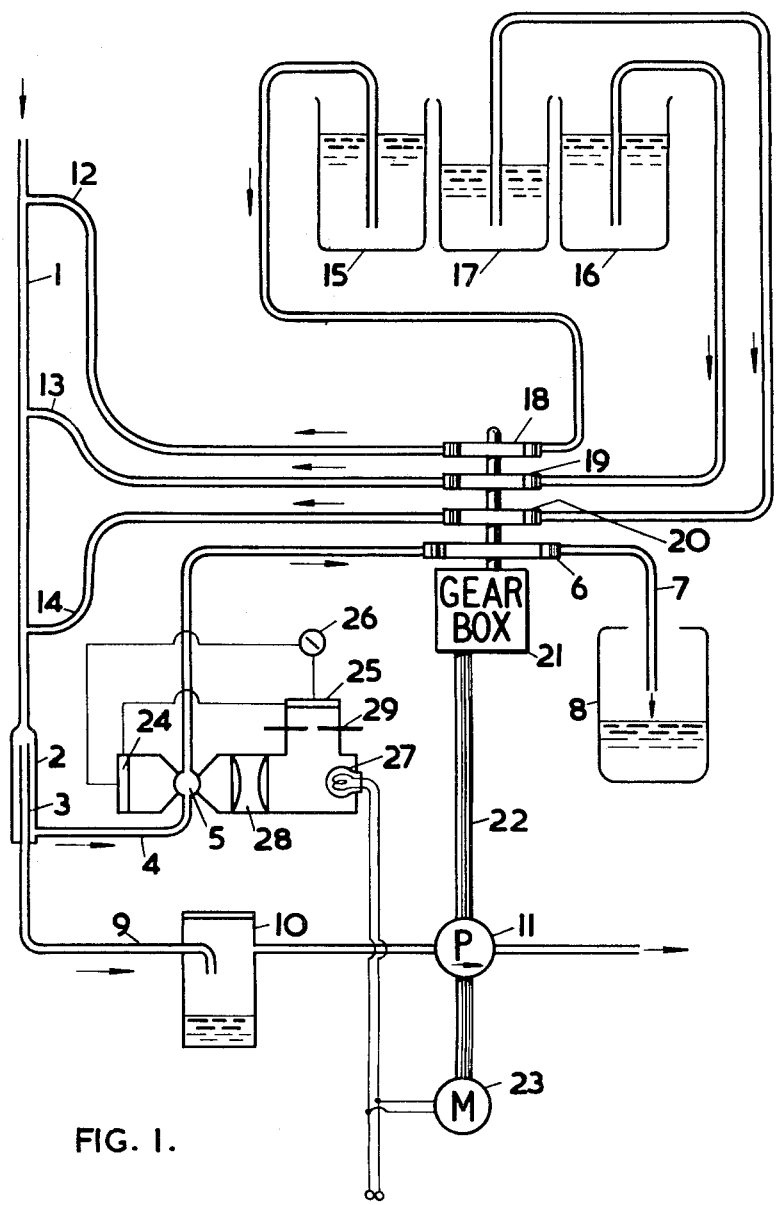

United States Patent Office 3,223,489
Patented Dec. 14, 1965

3,223,489
GAS SAMPLING APPARATUS
Alan Macpherson Kinnear, "Byeways" Firs Road,
Winterslow, England
Filed Sept. 12, 1963, Ser. No. 308,395
6 Claims. (Cl. 23—255)

The present invention relates to gas sampling apparatus for the detection of contaminants in the atmosphere or a volume of gas and this application is a continuation-in-part of application Serial No. 199,703, filed on June 4, 1962, and now abandoned.

The invention provides a gas sampling apparatus that can sample continuously to detect the presence of even small quantities of a contaminant by absorbing the contaminant in a liquid supplied continuously at a very slow rate and detecting its presence therein. The contaminant may be a gas, particulate or an aerosol and may be detected by observing any suitable change made in a physical or chemical property of the liquid. As the gas sampling apparatus uses liquid at only a very slow rate continuous sampling can be carried out using only relatively small quantities of liquid and any reagents used to detect the contaminant.

In accordance with the invention, a gas sampling apparatus for detecting a contaminant in gas, consists essentially of a sampling tube, means for rapidly forcing the atmosphere or gas to be sampled through the sampling tube, means for slowly injecting at least one liquid containing a contaminant-sensitive reagent into the tube to be forced by the gas stream into a thin film around the walls of the tube and be impelled along the tube absorbing any contaminant present, a separator comprising two concentric tubes into which the sampling tube feeds, the walls of the sampling tube being continuous with the walls of the outer tube of the separator, means for withdrawing liquid through the outer tube of the separator at a rate which is less than that at which liquid is supplied to the sampling tube, and a detecting device for observing a physical or chemical property of the liquid withdrawn from the said outer tube, which can reveal the presence of a contaminant in the gas.

By withdrawing liquid through the annular space between the inner and the outer tubes of the separator at a rate somewhat less than the total rate at which liquid is supplied to the sampling tube the liquid observed by the detecting device is free from gas, or contains at the most only a small consistent amount of fine bubbles, which does not affect the readings of the detecting device.

Any tendency for gas to pass into the outer tube of the separator is further minimised by making the cross-sectional area of the annular space between the outer and the inner tubes of the separator less than the cross-sectional area of the sampling tube. Also this purpose is served by making the cross-sectional area of the separator greater than the sampling tube. Furthermore the width of the annular space is advantageously of capillary dimensions so that the liquid film may be drawn into the annulus by capillary attraction.

Although the liquid may be tested simply by measuring physical properties such as refractive index, conductance or opacity, the apparatus can be readily designed to detect contaminants by observation of a change, such as a colour change, brought about in the liquid by the action of chemical reagents. The reagent or reagents may be added to the liquid stream before it is injected into the gas stream in the tube or after it has been reformed as a bulky stream. Where more than one reagent, requiring different reaction times, has to be added each reagent may be added separately at an appropriate position before the liquid is tested for the contaminant.

In order that the invention may be more clearly understood, apparatus in accordance with the invention, which detects a contaminant by means of a colour change caused by the contaminant in a liquid containing certain chemical reagents, will now be described.

Figure 2:
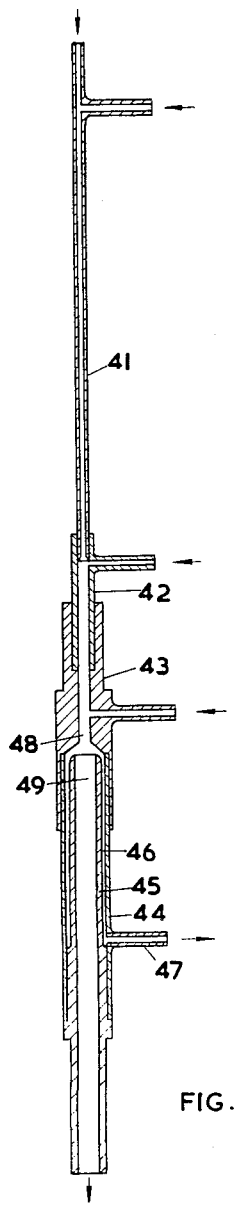

The apparatus will be described with reference to the accompanying drawings in which:

FIGURE 1 is a diagrammatic representation of the apparatus as a whole, showing the relationship of the various parts; and FIGURE 2 is a cross-sectional view of a typical sampling tube and separator.

The apparatus as represented in FIGURE 1 consists essentially of a narrow sampling tube 1 that leads into a separator having an outer tube 2 and an inner tube 3. The outer tube 2 feeds into a liquid outlet tube 4 that has a scanning cell 5 and a peristaltic liquid pump 6, the outlet from the pump 6 empties into the waste liquid container 8. The inner tube 3 leads into a gas outlet tube 9 that has a spray trap 10 and an air pump 11. A number of side tubes 12, 13, 14 are provided by which contaminant-sensitive reagents can be supplied to the sampling tube 1 from the storage vessels 15, 16, 17 by means of the peristaltic liquid pumps 18, 19, 20.

The air pump 11 and the gearbox 21 are both mounted on the driving shaft 22 of the electric motor 23, enabling the electric motor 23 to drive the air pump 11 and also the peristaltic liquid pumps 6, 18, 19, 20 through suitable gearing in the gearbox 21.

In operation, the atmosphere or gas to be sampled by the apparatus is drawn at high velocity through the sampling tube 1 by the action of the air pump 11. The liquid used for absorbing the contaminant from the atmosphere or gas is metered through the side tube 12, close to the air intake, into the sampling tube 1. This liquid, which may also participate in the reaction or combine chemically with the gas being tested is fed at a rate that is very small in comparison with the gas stream, for example, where gas is drawn in at a rate of a few litres per min., liquid is arranged to pass into the sampling tube at a few ml. per hour. The liquid is thereby formed into a thin film adhering to the walls of the sampling tube and impelled forward by the gas stream from which the contaminant is efficiently scrubbed.

Other reagents, if required to complete the detection reaction, are similarly fed as liquid solutions at appropriately slow rates through further side tubes as required, such as 13 and 14 as shown, which are positioned to allow sufficient time for any reaction to be carried out which should take place before the next reagent is added.

The reaction between the contaminant-sensitive reagent or reagents in the liquid film and a contaminant in the gas stream is arranged to produce or decompose a coloured substance in the liquid film, the intensity of the colour providing a measure of the concentration of the contaminant.

The liquid film in the tube 1 is however so thin that it affords only a weak indication of a colour and for a sensitive test to be carried out so that only relatively moderate concentrations of contaminant-sensitive reagent need be used, the liquid is converted from film to bulk form in a gas liquid separator that is an essential feature of this apparatus.

The separator consists of the outer tube 2 and the inner tube 3, separated by a narrow annulus. Both tubes are preferably, but not necessarily, larger than the sampling tube 1.

The central gas stream from the sampling tube is drawn across the gap to tube 3 by suction from the air pump 11. The velocity of the gas stream in the broader tube 3 is less than in the tube 1 so that there is a reduced possibility of the liquid film being dislodged from the outer wall at the entrance to the outer tube 2. The film velocity also decreases as the tube cross-section increases and the film is readily held by surface forces to the outer tube wall and reaches the narrow annulus between the inner and outer tubes. The annulus is preferably less than 0.025 in. wide so that strong capillary forces can help to complete the separation of the liquid from the gas stream and maintain full the annulus from which liquid is pumped by the peristaltic liquid pump 6 at almost the same rate as it collects. Any slight excess that is drawn off by the gas stream is trapped in the spray trap 10 before entry into the air pump 11.

The reagents may be fed by gravity from the tubes 12, 13 and 14 or by suction created by the reduced pressure in the sampling tube 1. As shown in the drawing they are conveniently fed by peristaltic liquid pumps 18, 19 and 20 respectively driven through a common shaft by the electric motor 23 through suitable gearing if necessary. The relative feed rates of the reagents and the gas flow can thereby be readily maintained in a desired ratio.

The liquid stream passing through the scanning cell 5 is scanned by a detecting device that consists of a scanning photo-electric cell 24 and a compensating photo-electric cell 25 connected in opposition so that their output signals tend to balance each other and a meter 26 to detect any state of imbalance that may exist between them. Light from the electric light bulb 27 passes through a condenser lens system 28 before traversing the scanning cell 5 and reaching the scanning photo-electric cell 24 where it generates an output signal that is exactly balanced by the output signal of the compensating photo-electric cell 25 when there is no contaminant present. This balance is achieved by adjusting the amount of light reaching the compensating photo-electric cell 25 by means of the iris 29, so that there is no electrical signal detected by the meter 26 when there is no contaminant present.

When a contaminant is present imbalance between the output signals from the two photoelectric cells 24 and 25 results in the production of an electric signal that is in accordance with the intensity of the colour of the stream of liquid passing through the scanning cell 5.

In the diagrammatic representation illustrated in FIG-URE 1 a meter 26 is shown for the detection of the electrical signal produced when a contaminant is present but the electrical signal may be used to provide a permanent and continuous record of the concentration of contaminant in the atmosphere or gas being sampled or it may be made to ring an alarm bell or initiate a suitable warning system when the concentration of contaminant reaches a predetermined danger level.

The sampling tube should be in general be long and narrow (without imposing the need for too much suction) so that there is a rapid liquid and gas flow providing adequate scrubbing. The sampling tube should have a smooth internal surface to aid the establishment of a thin liquid film.

The sampling tube and separator of a typical apparatus that draws in 5 litres of gas per min. and uses about 20 ml. per hour of each reagent solution provided in the storage vessels 15, 16 and 17 is shown in cross-section in FIGURE 2.

The sampling tube consists of an absorption section 41 in which any contaminant is scrubbed from the atmosphere of gas being sampled and in which a reaction may take place, and two sections 42 and 43 in which further reactions can take place. Each of the sections 41, 42 and 43 is provided with a side tube through which contaminant-sensitive reagents can be supplied to the sampling tube. The separator consists of a sleeve 44 fitted around an internal tube 45 leaving a narrow annulus 46. A side tube 47 enables the contents of the annulus 46 to be drawn off and fed to the detecting device.

The absorption section 41 has a bore of about 0.07 in. and in the separator the bore of the inner tube 45 is about 0.15 in. and the width of the annulus 46 through which liquid is withdrawn is about 0.01 in. The sampling tube and separator are an assembly of precision tubes made for example of stainless steel.

The detection of various gases may be carried out by means of two or even only one liquid reagent placed in whichever of the storage vessels is desired. For example sulphur dioxide may be detected by the loss of colour by a reddish purple acid solution of potassium permangate, chlorine by a browning of a solution of potassium iodide, and oxygen by a coloration of alkaline pyrogallol or ammoniacal chloride.

I claim:

1. A gas sampling apparatus for detecting a contaminant in a gas, which comprises a sampling tube, means for rapidly forcing the gas to be sampled through the sampling tube, means for slowly injecting at least one liquid contaminant-sensitive reagent into the tube to be forced by the gas stream into a thin film around the walls of the tube and be impelled along the tube absorbing any contaminant present, a separator comprising two concentric tubes into which the sampling tube feeds, the walls of the sampling tube being continuous with the wall of the outer tube of the separator, means for withdrawing liquid through the outer tube of the separator at a rate which is less than that at which liquid is supplied to the sampling tube, and a detecting device for observing a physical or chemical property of the liquid withdrawn from the said outer tube, which can reveal the presence of a contaminant in the gas.

2. Apparatus according to claim 1 in which the cross-sectional area of the inner tube of the separator is greater than the cross-sectional area of the sampling tube and cross-sectional area of the annular space between the outer and the inner tubes of the separator is less than the cross-sectional area of the sampling tube.

3. Apparatus according to claim 1, in which the width of the annular section is of capillary dimensions.

4. Apparatus according to claim 3 in which the width of the annular space is not greater than 0.025.

5. Apparatus according to claim 1 having a single motor for driving said means for forcing gas through the sampling tube and said means for withdrawing liquid through said outer tube of the separator.

6. Apparatus according to claim 4 wherein said motor also drives means for injecting reagents into the sampling tube.

References Cited by the Examiner

UNITED STATES PATENTS 2,949,345  8/1960  Clauss _____ 23—254 XR

FOREIGN PATENTS 454,834  10/1936  Great Britain.

OTHER REFERENCES

Thomas et al.: "Ind. and Engineering Chem., Anol. Ed." 18 383–387 (1946).

MORRIS O. WOLK, *Primary Examiner.*